United States Patent [19]

Toyota et al.

[11] 4,294,948

[45] Oct. 13, 1981

[54] PROCESS FOR PREPARING OLEFIN POLYMERS OR COPOLYMERS, AND CATALYST FOR USE IN SAID PROCESS

[75] Inventors: Akinori Toyota, Iwakuni; Ken Yoshitugu, Ohtake; Norio Kashiwa, Iwakuni, all of Japan

[73] Assignee: Mitsui Petrochemical Industries Ltd., Tokyo, Japan

[21] Appl. No.: 84,317

[22] Filed: Oct. 12, 1979

Related U.S. Application Data

[63] Continuation of Ser. No. 880,584, Feb. 23, 1978, abandoned.

[30] Foreign Application Priority Data

Mar. 4, 1977 [JP] Japan ................................ 52-22754

[51] Int. Cl.$^3$ .......................... C08F 4/02; C08F 10/06
[52] U.S. Cl. ................................ 526/125; 252/429 B; 526/140; 526/141; 526/142; 526/143; 526/153; 526/282; 526/348; 526/348.6; 526/351; 526/906
[58] Field of Search ....................... 252/429 B, 429 C; 526/125, 142

[56] References Cited

U.S. PATENT DOCUMENTS

| | | | |
|---|---|---|---|
| 4,069,169 | 1/1978 | Toyoda et al. | 526/125 |
| 4,076,924 | 2/1978 | Toyota et al. | 526/125 |
| 4,143,223 | 3/1979 | Toyota et al. | 526/125 |
| 4,221,894 | 9/1980 | Ushida et al. | 526/125 |

FOREIGN PATENT DOCUMENTS 2504036 8/1975 Fed. Rep. of Germany ...... 526/125

*Primary Examiner*—Edward J. Smith
*Attorney, Agent, or Firm*—Sherman & Shalloway

[57] ABSTRACT

A process for preparing an olefin polymer or copolymer by polymerizing or copolymerizing an olefin containing at least 3 carbon atoms which may contain at most 10 mole % of ethylene and/or a diene, in the presence of a catalyst composed of (A) a solid titanium catalyst component prepared by (1) reacting a mechanically pulverized product of an organic acid ester and a halogen-containing magnesium compound, with an active hydrogen-containing organic compound in the absence of mechanical pulverization, (2) reacting the resulting reaction product with an organometallic compound of a metal of Groups I to III of the periodic table in the absence of mechanical pulverization, and (3) washing the resulting solid reaction product with an inert organic solvent, reacting the washed solid reaction product with a titanium compound in the absence of mechanical pulverization, and separating the solid from the reaction system, and (B) an organometallic compound of a metal of Groups I to III of the periodic table; and a catalyst used therefor.

7 Claims, No Drawings

PROCESS FOR PREPARING OLEFIN POLYMERS OR COPOLYMERS, AND CATALYST FOR USE IN SAID PROCESS

This is a continuation of application Ser. No. 880,584, filed Feb. 23, 1978, now abandoned.

This invention relates to a process for producing highly stereoregular olefin polymers or copolymers having a superior particle size distribution and a high bulk density by polymerizing or copolymerizing olefins containing at least 3 carbon atoms which may contain at most 10 mole% of ethylene and/or a diene. The invention further relates to a catalyst for use in this process.

Numerous suggestions have been made as to the production of olefin polymers or copolymers with the aid of a catalyst composed of (A) a solid titanium catalyst component obtained by reacting a solid magnesium component with a titanium compound and (B) an organometallic compound of a metal of Groups I to III of the periodic table. These suggestions indicate that unpredictable changes will occur in the performance of a particular catalyst depending upon the combination of compounds for forming the solid magnesium component, the conditions for forming the solid magnesium component, and the combination of these conditions, and specify the use of catalysts prepared under different conditions for forming the solid magnesium component using different combinations of compounds for forming the solid magnesium component.

The present inventors have undertaken extensive work on the production of olefin polymers or copolymers with a catalyst containing as the solid titanium catalyst component a product obtained by reacting a solid magnesium component derived from (i) a halogen-containing magnesium compound, (ii) an active hydrogen-containing organic compound, (iii) an organic acid ester and (iv) an organometallic compound of a metal of Groups I to III of the periodic table, with a titanium compound.

As a prior technique using a solid titanium catalyst component of this or similar type, Dutch Laid-Open Patent Publication No. 7510394 (published on March 5, 1976) discloses the utilization of a solid titanium component obtained by reacting a solid magnesium component with a titanium compound in the absence of a free organometallic compound of a metal of Groups I to III of the periodic table and separating the solid component of the resulting reaction product, the solid magnesium component being obtained by separating a solid from a suspension of a reaction product derived from (i) a magnesium halide, (ii) an active hydrogen-containing organic compound, (iii) an organic acid ester and (iv) an organometallic compound of a metal of Groups I to III of the periodic table.

This publication does not describe at all that the organic acid ester and the magnesium halide are reacted under mechanical pulverization in forming the solid titanium component, and none of the working examples in this publication show mechanical pulverization. Goods results are obtained in the formation of olefin polymers having a high bulk density, but the results are not entirely satisfactory in the formation of polymers having a good particle size distribution with the inhibited formation of undesirable pulverulent polymers.

Furthermore, German Laid-Open Patent Publication No. 2553104 (published on June 8, 1977) discloses the use of a solid magnesium component obtained by (1) contracting a magnesium component selected from magnesium halides and their adducts with monocyclic aromatic monocarboxylic acid esters, with a monocyclic aromatic monocarboxylic acid ester by mechanical pulverization, or (2) by contacting the magnesium component and the ester with a titanium component selected from titanium compounds and their complexes with monocyclic aromatic monocarboxylic acid esters by mechanical pulverization.

In this publication, no active hydrogen-containing organic compound nor organometallic compound of a metal of groups I to III of the periodic table is used in the formation of a solid titanium compound. According to this suggestion, favorable results can be obtained in the activity of the catalyst, but difficulties are experienced in the formation of polymers having a good particle size distribution and a high bulk density.

German Laid-Open Patent Publication No. 2656055 (published on June 23, 1977) discloses the use of a solid titanium catalyst component obtained by treating (a) a mechanically copulverized product of a halogen-containing compound and an organic acid ester with (b) an organometallic compound of a metal of Groups I to III of the periodic table, and then reacting the resulting solid product with (c) a titanium compound in the absence of mechanical pulverization.

In this suggestion, an active hydrogen-containing organic compound is not used in the formation of the solid titanium catalyst component. With the technique suggested by this publication, it is difficult to obtain polymers having a satisfactory particle size distribution.

The present inventors have made extensive investigations in an attempt to provide an improved process which pruduces satisfactory results in any of the particle size distributions and bulk densities of the resulting polymers and the activity of catalyst, and consequently, succeeded in providing an improved process for producing highly stereoregular polymers having a good particle size distribution and a high bulk density while inhibiting the formation of pulverulent polymers. The investigations of the present inventors have led to the discovery that the aforesaid improved process can be achieved by using a specified catalyst which is composed of (A) a solid titanium catalyst component obtained by (1) reacting a mechanically pulverized product of an organic acid ester and a halogen-containing magnesium compound, with an active hydrogen-containing organic compound in the absence of mechanical pulverization, (2) further reacting the reaction product with an organometallic compound of a metal of Groups I to III of the periodic table in the absence of mechanical pulverization, (3) washing the resulting solid reaction product with an inert organic solvent, then reacting the washed solid reaction product with a titanium compound in the absence of mechanical pulverization, and separating a solid from the reaction system, and (B) an organometallic compound of a metal of Groups I to III of the periodic table.

It is an object of this invention therefore to provide a process for producing highly stereoregular olefin polymers or copolymers of olefins containing at least 3 carbon atoms with or without at most 10 mole% of ethylene and/or a diene, which process proves satisfactory in any of the particle size distributions and bulk densities of the resulting polymers or copolymers and the activity of catalyst.

Another object of the invention is to provide a catalyst for use in this process.

The above and other objects and advantages of the invention will become more apparent from the following description.

In the formation of the solid titanium catalyst component (A), the first step (1) is to react a mechanically pulverized product of an organic acid ester and a halogen-containing magnesium compound, with an active hydrogen-containing organic compound in the absence of mechanical pulverization.

In preparing the mechanically pulverized product of an organic acid ester and a halogen-containing magnesium compound, the acid ester and the magnesium compound may be separately fed in the free state and mechanically pulverized. Or they may be contacted in advance to form a complex or adduct, and mechanically pulverized in this state. Alternatively, these compounds may be fed in the form of compounds which can form these compounds by reaction under mechanical pulverization. For example, an organic acid ester can be formed in situ in the pulverization system by using a combination of an alkoxy-containing compound and an acid halide or a combination of a hydroxyl-containing organic compound and an acid halide.

The mechanical pulverization is performed preferably in the substantial absence of oxygen and water using, for example, a ball mill, vibratory mill, or impact mill. The pulverization time, although differing from apparatus to apparatus, is about 1 hour to about 10 days, for example. The pulverization can be performed at room temperature, and it is not particularly necessary to heat or cool the pulverization system. Where there is a vigorous exotherm, the pulverization system is preferably cooled by a suitable means. The temperature is, for example, about 0° to about 100° C. Preferably, the pulverization is carried out until the halogen-containing magnesium compound attains a surface area of at least 3 $m^2/g$, especially at least 30 $m^2/g$. The pulverization is usually carried out in a single step, but if desired, may be carried out in a multiplicity of steps. For example, it is possible first to pulverize the halogen-containing magnesium compound and pulverization aids to be described hereinbelow, then add the organic acid ester, and continue the pulverization.

The mechanical pulverization can be performed in the presence of organic or inorganic pulverization aids. Examples of the pulverization aids include inert organic liquid diluents such as hexane, heptane, and kerosene; organic solid diluents such as polystyrene and polypropylene; and inert inorganic solids such as boron oxide and silicon oxide.

The pulverization aids can be used in an amount of about 1/100 to about 1 time the weight of the halogen-containing magnesium compound.

In the present application, the term "mechanical pulverization" denotes pulverization by a suitable means of bringing the reaction components into mutual contact, for example milling in a ball mill, vibratory mill or impact mill, and does not include mere mechanical stirring within its definition. Accordingly, the term "absence of mechanical pulverization" means the absence of such pulverizing means, and does not preclude the presence of mere mechanical stirring that is customarily used in chemical reactions.

The halogen-containing magnesium compound is desirably a solid which is preferably an anhydrous as possible, but the inclusion of moisture in an amount which does not substantially affect the performance of the catalyst is permissible. For the convenience of handling, it is advantageous to use the magnesium compound as a powder having an average particle diameter of about 1 to about 50 microns. Larger particles can be used because they can be pulverized by the mechanical pulverization treatment during the preparation of the catalyst component (A). The halogen-containing magnesium compound may be those which contain other groups such as an alkoxy or phenoxy group, but magnesium dihalides give the best results.

Examples of preferred halogen-containing magnesium compounds are magnesium dihalides such as magnesium chloride, magnesium bromide and magnesium iodide, the magnesium chloride being most preferred, magnesium alkyl halides having $C_1$–$C_4$ alkyl such as ethyl magnesium chloride and butyl magnesium chloride and magnesium phenoxy halides such as

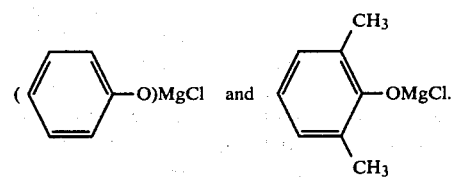

The amount of the organic acid ester used in the reaction of forming the mechanically pulverized product of the halogen-containing magnesium compound and the organic acid ester is about 0.01 to less than 1 mole, preferably about 0.1 to about 0.5 mole, per mole of the halogen-containing magnesium compound.

The organic ester used in forming the mechanically pulverized product is preferably selected from the group consisting of aliphatic carboxylic acid esters, halogenated aliphatic carboxylic acid esters, alicyclic carboxylic acid esters, and aromatic carboxylic acid esters. Preferred species are aliphatic carboxylic acid esters containing up to 18 carbon atoms, halogenated aliphatic carboxylic acid esters containing up to 18 carbon atoms, alicyclic carboxylic acid esters containing up to 12 carbon atoms, and aromatic carboxylic acid esters containing up to 20 carbon atoms.

Examples of such organic acid esters are esters formed between carboxylic acids or halocarboxylic acids selected from the group consisting of saturated or unsaturated aliphatic carboxylic acids containing 1 to 8 carbon atoms, especially 1 to 4 carbon atoms and their halogen-substitution products, and alcohols or phenols selected from the group consisting of saturated or unsaturated aliphatic primary alcohols containing 1 to 8 carbon atoms, especially 1 to 4 carbon atoms, saturated or unsaturated alicyclic alcohols containing 3 to 8 carbon atoms, especially 5 to 6 carbon atoms, phenols containing 6 to 10 carbon atoms, especially 6 to 8 carbon atoms, and alicyclic or aromatic primary alcohols having a $C_1$–$C_4$ aliphatic saturated or unsaturated primary alcohol moiety bonded to an alicyclic or aromatic ring with 3 to 10 carbon atoms. Further examples include esters formed between alicyclic carboxylic acids containing 6 to 12 carbon atoms, especially 6 to 8 carbon atoms, and saturated or unsaturated aliphatic primary alcohols containing 1 to 8, especially 1 to 4, carbon atoms. There can also be cited esters formed between aromatic carboxylic acids containing 7 to 12 carbon atoms, especially 7 to 10 carbon atoms, and alcohols or phenols selected from the group consisting of saturated or unsaturated aliphatic primary alcohols containing 1 to 8 carbon atoms, especially 1 to 4 carbon atoms, phenols containing 6 to 10 carbon atoms, especially 6 to 8 carbon atoms, and alicyclic or aromatic primary alcohols having a $C_1$–$C_4$ aliphatic saturated or unsaturated primary alcohol moiety bonded to an alicyclic or aromatic ring with 3 to 10 carbon atoms.

Specific examples of the aliphatic carboxylic esters are primary alkyl esters of saturated fatty acids such as methyl formate, ethyl acetate, n-amyl acetate, 2-ethylhexyl acetate, n-butyl formate, ethyl butyrate and ethyl valerate; alkenyl esters of saturated fatty acids such as vinyl acetate and allyl acetate; primary alkyl esters of unsaturated fatty acids such as methyl acrylate, methyl methacrylate, and n-butyl crotonate; and halogen-substitution products of these esters.

Specific examples of the alicyclic carboxylic acid esters include methyl cyclohexanecarboxylate, ethyl cyclohexanecarboxylate, methyl methylcyclohexanecarboxylate and ethyl methylcyclohexanecarboxylate.

Specific examples of the aromatic carboxylic acid esters primary alkyl esters of benzoic acid such as methyl benzoate, ethyl benzoate, n-propyl benzoate, n- or i-butyl benzoate, n- and i-amyl benzoate, n-hexyl benzoate, n-octyl benzoate, and 2-ethylhexyl benzoate; primary alkyl esters of toluic acid such as methyl toluate, ethyl toluate, n- or i-butyl toluate, and 2-ethylhexyl toluate; primary alkyl esters of anisic acid such as methyl anisate, ethyl anisate, or n-propyl anisate; and primary alkyl esters of naphthoic acid such as methyl naphthoate, n-propyl naphthoate, n-butyl naphthoate, and 2-ethylhexyl naphthoate.

Of these compounds, the aromatic carboxylic acid esters are preferred. Alkyl esters with 1 to 4 carbon atoms, particularly methyl or ethyl esters, of benzoic acid, p-toluic acid or p-anisic acid are especially preferred.

The mechanically pulverized product of an organic acid ester and a halogen-containing magnesium compound prepared in the manner described hereinabove is then reacted with an active hydrogen-containing organic compound in the absence of mechanical pulverization.

Preferably, this reaction is carried out in the presence of an inert organic liquid diluent such as hexane, heptane, kerosene and toluene. The reaction can be performed, for example, by adding the active hydrogen-containing organic compound to a suspension of the mechanically pulverized product in an inert organic liquid diluent of the type exemplified hereinabove. The amount of the mechanical pulverized product is preferably about 10 to about 500 g per liter of diluent. Since the reaction proceeds at room temperature, heating or cooling is not particularly required. The reaction temperature is properly chosen, for example, from the range of about 0° to about 100° C. The reaction time can also be varied as desired, and for example, it is about 10 minutes to about 5 hours. The amount of the active hydrogen-containing organic compound can be suitably selected. The amount of the active hydrogen-containing organic compound can be suitably selected, and for example, is preferably about 0.01 to about 10 moles, more preferably about 0.05 to about 3 moles, especially about 0.1 to about 1 mole, per magnesium atom in the mechanically pulverized product.

Examples of the active hydrogen-containing organic compound are alcohols, phenols, thiols, primary and secondary amines, aldehydes, organic acids, and amides and imides of the organic acids. The alcohols and phenols are especially preferred. Examples of these especially preferred active hydrogen-containing organic compounds include aliphatic alcohols containing 1 to 8 carbon atoms such as methanol, ethanol, n-propanol, n-butanol, i-pentanol, hexanol, 2-ethylhexanol and ethylene glycol monomethyl ether; alicyclic alcohols containing 5 to 12 carbon atoms such as cyclohexanol or methylcyclohexanol; alcohols with 7 to 18 carbon atoms containing an aromatic ring such as benzyl alcohol, phenethyl alcohol or cumyl alcohol; and phenols containing 6 to 18 carbon atoms such as phenol, cresol, 2,6-dimethylphenol, butyl phenol, octyl phenol, nonyl phenol, dibutyl phenol, cumyl phenol and naphthol.

The resulting reaction product is further reacted with an organometallic compound of a metal of Groups I to III of the periodic table in the absence of mechanical pulverization.

This reaction is carried out also preferably in the presence of an inert organic liquid diluent exemplified hereinabove with regard to the reaction of the mechanically pulverized product with the active hydrogen-containing organic compound. The reaction is carried out preferably at a temperature of about 0° C. to about 100° C., and the reaction time is, for example, about 10 minutes to about 10 hours. The amount of the organometallic compound of a metal of Groups I to III of the periodic table can be properly chosen, and is preferably about 0.01 to about 10 moles, more preferably about 0.1 to about 10 moles, per mole of the active hydrogen-containing compound.

Preferably, the organometallic compound of a metal of Groups I to III of the periodic table is selected from the group consisting of:

(1) organoaluminum compounds of the formula $$R^1_m Al(OR^2)_n H_p X_q$$

wherein $R^1$ and $R^2$ are identical to, or different from, each other, and represent a hydrocarbon radical containing 1 to 15 carbon atoms, preferably, an alkyl group containing 1 to 8 carbon atoms, X represents a halogen atom, m is more than 0 but not more than 3 ($0 < m \leq 3$), n is at least 0 but less than 3 ($0 \leq n < 3$), p is at least 0 but less than 3 ($0 \leq p < 3$), and q is at least 0 but less than 3 ($0 \leq q < 3$), with the proviso that $m+n+p+q=3$, (2) aluminum complex alkyl compounds of the formula $$M^1 Al R^1_4$$

wherein $R^1$ is the same as defined hereinabove, $M^1$ represents lithium, sodium or potassium, (3) compounds of the formula $$R^1 R^3 M^2$$

wherein $R^1$ is the same as defined hereinabove, $R^3$ is the same as $R^1$, or represents a halogen atom, and $M^2$ represents magnesium, zinc or cadmium.

Examples of the organoaluminum compounds (1) above are as follows:

(a) $p=q=0$ $$R^1_m Al(OR^2)_{3-m}$$

wherein $R^1$ and $R^2$ are the same as defined hereinabove, and m is preferably 1.5 to 3 ($1.5 \leq m \leq 3$).

(b) $n=p=0$

wherein $R^1$ is the same as defined hereinabove, X is a halogen atom, and m is $0<m<3$.

(c) $n=q=0$

wherein $R^1$ is the same as defined hereinabove, and m is preferably $2 \leq m < 3$.

(d) $p=0$

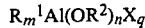

wherein $R^1$ and $R^2$ are the same as defined hereinabove, X is a halogen, $0<m\leq 3$, $0\leq n<3$, $0\leq q<3$, and $m+n+q=3$.

Specific examples of the aluminum compound (1) include trialkyl aluminums such as triethyl aluminum or tributyl aluminum and combinations of these, preferably triethyl aluminum and tributyl aluminum ($p=q=0$, and $m=3$); dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; and alkoxylated alkyl aluminums having an average composition expressed, for example, by $R_{2.5}{}^1 Al(OR^2)_{0.5}$ ($p=q=0$, $1.5 \leq m < 3$); partially halogenated alkyl aluminums ($n=p=0$) such as dialkyl aluminum halogenides ($m=2$) such as diethyl aluminum chloride, dibutyl aluminum chloride and diethyl aluminum bromide; alkyl aluminum sesquihalogenides ($m=1.5$) such as ethyl aluminum sesquichloride, butyl aluminum sesquichloride and ethyl aluminum sesquibromide; and alkyl aluminum dihalogenides ($m=1$) such as ethyl aluminum dichloride, propyl aluminum dichloride and butyl aluminum dibromide; partially hydrogenated alkyl aluminums ($n=q=0$) such as dialkyl aluminum hydrides ($m=2$) such as diethyl aluminum hydride and dibutyl aluminum hydride; and alkyl aluminum dihydrides ($m=1$) such as ethyl aluminum dihydride and propyl aluminum dihydride; and partially alkoxylated and halogenated alkyl aluminums ($p=0$) such as ethyl aluminum ethoxychloride, butyl aluminum butoxychloride and ethyl aluminum ethoxybromide ($m=n=q=1$).

Examples of the organometallic compounds (2) to (4) above include lithium aluminum tetraethyl [(LiAl(C$_2$H$_5$)$_4$], sodium aluminum tetrabutyl, potassium aluminum tetraethyl, diethyl magnesium, diethyl zinc, diethyl cadmium and ethyl magnesium chloride.

In the final step [step (3)] of forming the solid titanium catalyst component (A) in accordance with this invention, the resulting solid reaction product obtained by reaction with the organometallic compound is washed with an inert organic solvent, and the washed product is reacted with a titanium compound. This reaction is carried out in the absence of mechanical pulverization. The inert organic solvent to be used in the washing treatment may, for example, be hexane, heptane and kerosene. If this washing treatment is omitted, inconveniences such as a deterioration in the performance of catalyst by the inclusion of the inert titanium component in the catalyst are caused. It is necessary therefore to use the solid reaction product which has been washed in the manner described above.

The reaction of the washed solid reaction product with the titanium compound in the absence of mechanical pulverization can be performed by suspending the washed solid reaction product in a liquid titanium compound or a solution of a titanium compound in an inert organic solvent of the type exemplified hereinabove under the reaction conditions.

The amount of the titanium compound is at least about 0.001 mole, preferably at least about 0.1 mole, especially preferably at least about 10 moles, most preferably at least about 50 moles, per mole of magnesium in the washed solid reaction product. The reaction temperature is usually from room temperature to about 200° C., and the reaction time is about 10 to about 5 hours. The reaction may be performed for longer periods of time. After the reaction, the unreacted titanium compound is removed by filtration or decantation, and the reaction product is preferably washed with a suitable inert solvent such as hexane, heptane or kerosene to remove the unsupported titanium compound as much as possible.

Examples of the titanium compound used in this reaction are expressed by the general formula

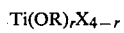

wherein R represents a hydrocarbon group, X represents a halogen atom, and r is 0 to 4 ($0 \leq r \leq 4$).

Examples of the hydrocarbon group R are alkyl groups with 1 to 8 carbon atoms, cycloalkyl groups with 5 to 12 carbon atoms, and aryl groups with 6 to 18 carbon atoms. Of these titanium compounds, titanium tetrahalides such as tetrachloride are especially preferred.

Suitably, the solid titanium catalyst component (A) in accordance with this invention contains about 1 to about 5% by weight of titanium, about 15 to about 30% by weight of magnesium, about 50 to about 70% by weight of halogen and about 2.5 to about 10% by weight of the organic acid ester based on the weight of the catalyst component, and has a specific surface area of usually at least 10 m$^2$/g, preferably at least 50 m$^2$/g, and more preferably at least 100 m$^2$/g.

According to this invention, there is provided a catalyst composed of (A) the solid titanium catalyst component and (B) an organometallic compound of a metal of Groups I to III of the periodic table. There is also provided a process for producing olefin polymers or copolymers of olefins containing at least 3 carbon atoms which may contain at most 10 mole% of ethylene and/or a diene.

In the catalyst system used in this invention, the organometallic compound (B) may, for example, be the organoaluminum compounds (1) exemplified hereinabove as the organometallic compounds of a metal of Groups I to III of the periodic table.

The catalyst of this invention can catalyze the polymerization of α-olefins having at least 3 carbon atoms, preferably α-olefins having 3 to 8 carbon atoms such as propylene, 1-butene, 1-octene, 4-methylpentene-1 and 3-methyl-1-butene, for example the polymerization or copolymerization of α-olefins having at least 3 carbon atoms, or the copolymerization of α-olefins having at least 3 carbon atoms and not more than 10 mole% of ethylene and/or a diene. Examples of the diene are butadiene, dicyclopentadiene, ethylidenenorbornene, and 1,5-hexadiene. The polymerization or copolymerization can be performed under known conventional conditions. For example, the polymerization or copolymerization can be carried out in the presence or absence of an inert solvent such as hexane, heptane or kerosene at a temperature of about 0° to about 300° C., preferably about 20° to about 200° C., more preferably about 50° to about 180° C. and a pressure of 1 to about 70 kg/cm², preferably 1 to about 50 kg/cm², more preferably about 2 to about 20 kg/cm². Liquefied monomers can also be used as a solvent. The polymerization or copolymerization can be carried out by using 0.0001 to 1 millimole, calculated as titanium atom, of the solid titanium catalyst component (A) per liter of the inert solvent (or per liter of the space in the polymerization zone in the absence of the solvent), and the organometallic compound (3) in an amount such that the molar ratio of the metal atom in the organometallic compound to the titanium atom is about 1:1 to about 1000:1, preferably about 1:1 to about 100:1. During the polymerization, a molecular weight controlling agent such as hydrogen, and a stereoregularity controlling agent, for example an aromatic carboxylic acid ester, such as benzoic acid, p-toluic acid or anisic acid esters, for example $C_1$–$C_4$ alkyl esters, especially methyl or ethyl esters, may be used conjointly. Such stereoregularity controlling agents can be used in an amount of preferably about 0.01 to about 2 moles, more preferably about 0.1 to about 1 mole, per mole of the organometallic compound (B).

The following Examples illustrate the present invention in more detail.

EXAMPLE 1

Preparation of the titanium catalyst component

Anhydrous magnesium chloride (20 g), 4.85 g of ethyl benzoate and Si-Oil (viscosity 100 C.S. at 25° C.) were charged under an atmosphere of nitrogen into a ball mill cylinder made of stainless steel (SUS 32) and having an inside diameter of 100 mm which has an inner capacity of 0.8 liter and accommodated 2.8 kg of stainless steel (SUS 32) balls having a diameter of 15 mm. Then, these compounds were contacted and pulverized for 24 hours at an impact acceleration of 7 G. Ten grams of the resulting pulverized product was suspended in 50 ml of kerosene, and 5.67 g of p-cresol was added dropwise at room temperature. After the addition, the mixture was heated to 50° C., and stirred for 1 hour. Then, 3.00 g of triethyl aluminum was added dropwise at room temperature, the mixture was stirred at room temperature for 1 hour to effect contact. The solid portion was collected by filtration, and washed with 1 liter of hexane.

The resulting solid treated product was suspended in a solution containing 150 ml of titanium tetrachloride and 30 ml of kerosene. The suspension was heated to 100° C., and contacting was performed for 1 hour. The solid portion was collected by filtration, and washed with 1 liter of hexane to afford a titanium catalyst component.

The resulting catalyst component contained 2.6% by weight of titanium, 65.0% by weight of chlorine, 22.0% by weight of magnesium, and 7.3% by weight of ethyl benzoate, and had a specific surface area of 192 m²/g.

Polymerization

An autoclave with an inner capacity of 2 liters was charged with 0.75 liter of hexane, and purged with propylene, and then 3.75 millimoles of triethyl aluminum, 1.25 millimoles of methyl p-toluate, 0.0225 millimole calculated as titanium of the aforesaid titanium catalyst component, and 400 Nml of hydrogen were fed into the system in this order. The contents were heated to 60° C., and propylene was introduced and polymerized for 4 hours at 7 kg/cm².G. After the polymerization, the solid component was filtered to afford 435.3 g of polypropylene as a white powder. The polymer had a boiling n-heptane extraction residue of 95.7%, an apparent density of 0.38 g/ml, and a melt index (MI) of 5.1. Sieving of the product showed that it contained 95% of particles having a size of at least 105 microns.

Concentrating the liquid phase afforded 11.4 g of a solvent-soluble polymer.

EXAMPLES 2 TO 7

Example 1 was repeated except that the type and amount of the active hydrogen-containing compound and the amount of triethyl aluminum were changed. The results are shown in Table 1.

TABLE 1

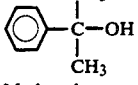

*PSD = particle size distribution

EXAMPLE 8

Preparation of a titanium catalyst component

Ten grams of the pulverized product obtained in Example 1 was suspended in 50 ml of kerosene, and 1.45 g of ethanol was added dropwise at room temperature.

The mixture was stirred for 1 hour at room temperature. Furthermore, 7.59 g of diethyl aluminum chloride was added dropwise at room temperature. The mixture was stirred for 1 hour at room temperature. The solid portion was collected by filtration, washed with 1 liter of hexane, and dried. The solid was suspended in 200 ml of $Ti(OC_2H_5)_{0.1}Cl_{3.9}$, and contacted with stirring for 2 hours at 110° C. The solid portion was collected by filtration, and washed with 1 liter of hexane to afford a titanium catalyst component. The titanium catalyst component contained 2.0% by weight of titanium and 66.0% by weight of chlorine, and had a specific surface area of 213 m²/g.

Polymerization

Propylene was polymerized under the same conditions as in Example 1 except that 3.75 millimoles of triethyl aluminum was changed to 3.75 millimoles of triisobutyl aluminum, and 1.25 millimoles of methyl p-toluate was changed to 1.25 millimoles of ethyl p-toluate.

The results are shown in Table 2.

EXAMPLE 9

Preparation of a titanium catalyst component

Anhydrous magnesium chloride (20 g), 5.74 g of ethyl o-toluate, and 3 ml of kerosene were pulverized and contacted under the conditions set forth in Example 1.

Ten grams of the resulting pulverized product was suspended in 100 ml of kerosene, and 1.45 g of ethanol was added dropwise at room temperature. After the addition, the mixture was stirred for 1 hour at 50° C. Furthermore, 12.49 g of triisobutyl aluminum was added dropwise at room temperature, and the mixture was stirred for 5 hours at room temperature. The supernatant liquid obtained by decantation was fully washed with kerosene. To 40 ml of the slurry was added 150 ml of $TiCl_4$. The mixture was stirred for 2 hours at 110° C., and by filtration, the solid portion was collected and washed fully with hexane.

The resulting titanium catalyst component contained 2.1% by weight of titanium and 64.0% by weight of chlorine.

Polymerization

Polymerization was carried out under the same conditions as in Example 8 except that the ethyl p-toluate was changed to ethyl anisate.

The results are shown in Table 2.

TABLE 2

| Example | Amount of white powdery polymer (g) | Amount of solvent-soluble polymer (g) | Boiling n-heptane extraction residue (%) | t-II (%) | Apparent density (g/ml) | MI (g/10 min.) | PSD (wt. % of partic with a size of at least 105 μ) |
|---|---|---|---|---|---|---|---|
| 8 | 275.1 | 7.9 | 95.0 | 92.3 | 0.32 | 10.9 | 98.0 |
| 9 | 230.7 | 6.9 | 95.6 | 92.8 | 0.34 | 11.4 | 96.0 |

EXAMPLE 10

A 24-liter autoclave was purged with propylene and 15 liters of hexane was charged into it. Then, 75 millimoles of triethyl aluminum, 25 millimoles of methyl p-toluate, 0.3 millimole, calculated as atom, of the titanium catalyst component were fed. While feeding 900 Nl/hr of propylene, 45 Nl/hr of ethylene and 7 Nl/hr of $H_2$, the temperature of the inside of the autoclave was raised to 50° C. Thus, ethylene and propylene were polymerized for 5 hours at constant flow rates. Centrifugal separation afforded a white powdery polymer. The polymer contained 3.0 ppm of Ti, and by infrared absorption spectroscopy, was found to contain 7.8 mole% of ethylene. The polymer had an apparent density of 0.37 g/l and a melt index of 6.2.

COMPARATIVE EXAMPLES 1 TO 3

A catalyst was prepared in the same way as in Example 3 except that the pulverization was omitted (Comparative Example 1), the treatment with ethanol was omitted (Comparative Example 2), or the treatment with ethanol and the treatment with triethyl aluminum were omitted (Comparative Example 3). The polymerization conditions were the same as those used in Example 3. The results are shown in Table 3.

TABLE 3

| Comparative Example | Catalyst preparing conditions | | Composition | | White powdery polymer (g) | Solvent-soluble polymer (g) | Boiling n-heptane extraction residue of the powdery polymer (%) | t-II (%) | Apparent density (g/ml) | MI (g/10 min.) | PSD (wt. % of particles with a size of at least 105 μ) |
|---|---|---|---|---|---|---|---|---|---|---|---|
| | Mg compound | Active H-containing compound | Ti (mg/g) | Cl (mg/g) | | | | | | | |
| 1 | 7.2 g of $MgCl_2$ | 0.97 g of ethanol | 10 | 685 | 194.4 | 12.6 | 92.1 | 86.5 | 0.25 | 3.1 | 80.5 |
| 2 | 10 g of the pulverized product | — | 27 | 620 | 205.0 | 14.5 | 93.6 | 87.0 | 0.33 | 4.8 | 82.3 |
| 3 | 10 g of the pulverized | — | 24 | 630 | 272.8 | 8.5 | 96.3 | 93.4 | 0.32 | 5.9 | 80.6 |

TABLE 3-continued

| | Catalyst preparing conditions | | Composition | | Results of polymerization | | | | | |
|---|---|---|---|---|---|---|---|---|---|---|
| Comparative Example | Mg compound | Active H-containing compound product | Ti (mg/g) | Cl (mg/g) | White powdery polymer (g) | Solvent-soluble polymer (g) | Boiling n-heptane extraction residue of the powdery polymer (%) | t-II (%) | Apparent density (g/ml) | MI (g/10 min.) | PSD (wt. % of particles with a size of at least 105 μ) |

EXAMPLES 11 TO 14

Example 1 was repeated under the catalyst preparing conditions and polymerization conditions shown in Tables 4 and 5. The results are shown in Table 5.

TABLE 4

| Example | Mg compound Type | Mg compound Amount (g) | Pulverizing conditions: Organic acid ester Type | Amount (g) | Third component Type | Amount (g) | Temperature (°C) | Time (hrs.) | Treatment with an active hydrogen-containing compound: Compound | Amount (g) | Temperature (°C) | Time (hrs.) |
|---|---|---|---|---|---|---|---|---|---|---|---|---|
| 11 | MgCl$_2$ | 40 | n-Butyl benzoate / Ethyl acetate | 18.7 / 3.7 | Kerosene | 6 | 80 | 144 | 2-Ethylhexanol | 0.8 | 80 | 2 |
| 12 | Ethyl MgCl$_2$ | 10 | anisate / H–C$_6$H$_5$–COOC$_2$H$_5$ | 1.9 / 0.8 | — | — | 70 | 6 | 2,6-Dimethyl phenol | 10.1 | 50 | 4 |
| 13 | Mg(OC$_2$H$_5$)$_{0.5}$Cl$_{1.5}$ | 20 | C$_6$H$_5$–C(=O)–Cl | 12.9 | Si-oil (TSF-451-20CS) | 5 | 70 | 48 | Butanol | 1.2 | 50 | 2 |
| 14 | Mg(C$_4$H$_9$)$_{0.1}$Cl$_{1.9}$ | 20 | 2-Ethylhexyl benzoate | 15.8 | Si-oil (TSF-451-20CS) | 1 | 70 | 48 | Butanol | 0.8 | 0 | 6 |

| Example | Treatment with an organoaluminum compound: Compound | Amount (g) | Temperature (°C) | Time (hrs.) | Treatment with a Ti compound: Compound | Amount (g) | Solvent | Temperature (°C) | Time (hrs.) | Composition Ti (mg/g) | Composition Cl (mg/g) |
|---|---|---|---|---|---|---|---|---|---|---|---|
| 11 | Al(n-C$_6$H$_{13}$)$_3$ | 17.6 | 20 | 1 | TiCl$_4$ | 100 | — | 80 | 2 | 23 | 640 |
| 12 | Al(i-C$_4$H$_9$)$_2$H | 1.2 | 0 | 2 | TiBr$_4$ / Ti(Oφ)$_{0.1}$Cl$_{3.9}$ | 5 / 300 | — / Kerosene (50 ml) | 130 / 100 | 2 / 1 | 29 | 620 |
| 13 | Al(C$_2$H$_5$)$_2$(OC$_4$H$_9$) | 5.0 | 100 | 1 | TiCl$_4$ | 50 | — | 20 | 6 | 25 | 630 |
| 14 | C$_4$H$_9$MgCl | 2.6 | 80 | 2 | TiCl$_4$ | 200 | — | 100 | 2 | 24 | 630 |

TABLE 5

| | Polymerization conditions | | | | | | | | |
|---|---|---|---|---|---|---|---|---|---|
| | Organoaluminum compound | | Ester | | Temp- | | α-Olefin | | |
| Example | Type | Amount (g) | Type | Amount (g) | rature (°C.) | Time (hrs.) | Type | Pressure (kg/cm². G) | Amount of Ti used (millimoles) |
| 11 | Al(n-$C_6H_{13}$)$_3$ | 2.82 | $CH_3$—⟨C$_6H_4$⟩—$COOC_4H_9$ | 0.083 | 75 | 1 | 500 g of propylene | 35 | 0.001 |
| 12 | Al($C_2H_5$)$_{2.9}$(O$C_4H_9$)$_{0.1}$ | 0.24 | $CH_3$—⟨C$_6H_4$⟩—$COCH_3$ | 0.086 | 5 / 35 | 0.1 / 1 | 400 g of 1-butene | 2.5 | 0.002 |
| 13 | Al($C_2H_5$)$_3$ | 1.71 | ⟨C$_6H_5$⟩—$COOC_4H_9$ | 1.068 | 20 / 50 | 0.1 / 1 | 92 moles % of propylene and 8 mole % of ethylene (750 ml of kerosene) | 0 | 0.3 |
| 14 | Al($C_2H_5$)$_{2.9}H_{0.1}$ | 0.34 | $CH_3O$—⟨C$_6H_4$⟩—$COOC_2H_5$ | 0.15 | 50 | 1 | 96 mole % of propylene and 4 mole % of ethylene Ethylidene norbornone (2 ml) Butadiene (0.05 ml) (750 ml of kerosene) | 0 | 0.3 |

| | Results of polymerization | | | | | | | |
|---|---|---|---|---|---|---|---|---|
| Example | White powdery polymer (g) | Solvent-soluble polymer (g) | t-II (%) | MI (g/10 min.) | Apparent density (g/ml) | PSD (wt. % of particles with a size of at least 105 μ) | Specific activity (g-PP/mmol Ti. hr. atm.) | Remarks |
| 11 | 11.6 | — | 97.3 | below 0.01 | 0.38 | 96.4 | | |
| 12 | 183 | — | 92.1 | below 0.01 | 0.30 | 98.5 | | *Extracted with boiling ethyl ether |
| 13 | 132.3 | 13.1 | — | below 0.01 | 0.33 | — | 485 | Ethylene content 5.1 mole %; a gaseuos mixture of ethylene and propylene was reacted while being passed through the reactor. |
| 14 | 70.3 | 5.2 | — | below 0.07 | 0.33 | — | 259 | 148° C. (melting point by DSC); the diene component was added at the early stage, and a gaseous mixture of ethylene and propylene was reacted while being passed through the reactor. |

What we claim is:

1. A process for preparing an olefin polymer or copolymer by polymerizing or copolymerizing an olefin containing at least 3 carbon atoms which may contain at most 10 mole% of ethylene and/or a diene, at a temperature of about 0° to about 300° C., and a pressure of about 1 to about 7 kg/cm², in the presence of a catalyst composed of (A) a solid titanium catalyst component obtained by reacting a solid magnesium compound derived from (i) a halogen-containing magnesium compound, (ii) an active hydrogen-containing organic compound, (iii) an organic acid ester and (iv) an organometallic compound of metal of Groups II to III of periodic table, with a titanium compound, and (B) an organoaluminum compound; characterized in that the solid titanium catalyst component (A) is prepared by (1) reacting a mechanically pulverized product of an aromatic carboxylic acid ester containing up to 20 carbon atoms, and a halogen-containing magnesium compound selected from the group consisting of magnesium dihalides, magnesium alkyl halides, magnesium alkoxy halides and magnesium phenoxy halides, said mechanically pulverized product being obtained by milling at a temperature of about 0° to about 100° C. during the period of about 1 hour to about 10 days, with an active hydrogen-containing organic compound selected from the group consisting of aliphatic alcohols containing 1 to 8 carbon atoms, alicyclic alcohols containing 5 to 12 carbon atoms, aromatic alcohols containing 7 to 8 carbon atoms, and phenols containing 6 to 18 carbon atoms, in the absence of mechanical pulverization, (2) reacting the resulting reaction product with an organometallic compound of a metal of Groups II to III of the periodic table selected from the group consisting of:

(a) organoaluminum compounds of the formula

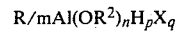

wherein $R^1$ and $R^2$ are identical to, or different from, each other and represent an alkyl group containing 1 to 8 carbon atoms, X represents a halogen atom, m is more than 0 but not more than 3 ($0<m\leq3$), n is at least 0 but less than 3 ($0\leq n<3$), p is at least 0 but less then 3 ($0\leq p<3$), q is at least 0 but less than 3 ($0\leq q<3$), and $m+n+p+q=3$, and (b) compounds of the formula $$R^1R^3M^2$$

wherein $R^1$ is as defined above, $R^3$ is the same as $R^1$ or represents a halogen atom, and $M^2$ represents magnesium, in the absence of mechanical pulverization, and (3) washing the resulting solid reaction product with an inert organic solvent, reacting the washed solid reaction product with a titanium compound of the formula $$Ti(OR)_rX_{4-r}$$

wherein R represents a hydrocarbon group, X represents a halogen atom, and r is a number of 0 to 4 ($0\leq r\leq4$), in the absence of mechanical pulverization, and separating the solid from the reaction system, wherein the molar ratio of the organic acid ester and halogen-containing magnesium compound is from about 0.01 to 1 less than 1 to 1; the ratio of the mechanically pulverized product to the active hydrogen-containing organic compound is from about 0.01 to about 10 moles of organic compound per magnesium atom in the pulverized product; and the amount of the organometallic compound of a metal of Groups II to III of the periodic table is from about 0.01 moles to about 10 moles per mole of the active hydrogen-containing compound.

2. The process of claim 1 wherein the amount of the solid titanium catalyst component (A) is 0.0001 to 1 millimole calculated as titanium atom per liter of an inert solvent, or per liter of space in the polymerization zone when the solvent is absent, and the amount of the organoaluminum compound (B) is such that the molar ratio of the metal atom to the titanium atom is 1:1 to 1000:1.

3. The process of claim 1 wherein the organoaluminum compound (B) is an organoaluminum compound of the formula $$R^1{}_mAl(OR^2)_nH_pX_q$$

wherein $R^1$ and $R^2$ are identical to, or different from, each other and represent an alkyl group containing 1 to 8 carbon atoms, X represents a halogan atom, m is more than 0 but not more than 3 ($0<m\leq3$), n is at least 0 but less than 3 ($0\leq n<3$), p is at least 0 but less than 3 ($0\leq p<3$), q is at least 0 but less than 3 ($0\leq q<3$), and $m+n+p+q=3$.

4. The process of claim 1 wherein the olefin is an α-olefin containing 3 to 8 carbon atoms.

5. The process of claim 1 wherein the olefin is an α-olefin containing 3 to 8 carbon atoms and the organoaluminum compound (B) is an organoaluminum compound of the formula $$R^1{}_mAl(OR)_nH_pX_q$$

wherein $R^1$ and $R^2$ are identical to, or different from, each other and represent an alkyl group containing 1 to 8 carbon atoms, X represents a halogen atom, m is more than 0 but not more than 3 ($0<m\leq3$), n is at least 0 but less than 3 ($0\leq n<3$), p is at least 0 but less than 3 ($0\leq p<3$), q is at least 0 but less than 3 ($0\leq q<3$), and $m+n+p+q=3$.

6. A catalyst for polymerizing or copolymerizing an α-olefin having at least 3 carbon atoms and copolymerizing an α-olefin having at least 3 carbon atoms with at most 10 mole % of ethylene and/or a diene, said catalyst being composed of:

(A) a solid titanium catalyst component prepared by reacting a mechanically pulverized product of an aromatic carboxylic acid ester containing up to 20 carbon atoms, and a halogen-containing magnesium compound compound selected from the group consisting of magnesium dihalides, magnesium alkyl halides, magnesium alkoxy halides and magnesium phenoxy halides, said mechanically pulverized product being obtained by milling at a temperature of about 0 to about 100° C. during the period of about 1 hour to about 10 days, with an active hydrogen-containing organic compound selected from the group consisting of aliphatic alcohols containing 1 to 8 carbon atoms, alicyclic alcohols containing 5 to 12 carbon atoms, aromatic alcohols containing 7 to 18 carbon atoms and phenols containing 6 to 18 carbon atoms, in the absence of mechanical pulverization, reacting the resulting reaction product with an organometallic compound of a metal of Groups II and III of the periodic table selected from the group consisting of:

(a) organoaluminum compounds of the formula $$R^1{}_mAl(OR^2)_nH_pX_q$$

wherein $R^1$ and $R^2$ are identical to, or different from, each other and represent an alkyl group containing 1 to 8 carbon atoms, X represents a halogen atom, m is more than 0 but not more than 3 ($0<m\leq3$), n is at least 0 but less than 3 ($0\leq n<3$), p is at least 3 but less than 3 ($0\leq p<3$), q is at least 0 but less than 3 ($0\leq q<3$), and $m+n+p+q=3$, and (b) compounds of the formula $$R^1R^3M^2$$

wherein $R^1$ is as defined above, $R^3$ is the same as $R^1$ or represents a halogen atom, and $M^2$ represents magnesium, in the absence of mechanical pulverization, washing the resulting solid reaction product with an inert organic solvent, reacting the washed solid reaction product with a titanium compound of the formula $$Ti(OR)_rX_{4-r}$$

wherein R represents a hydrocarbon group, X represents a halogen atom, and r is a number of 0 to 4 ($0\leq r\leq4$), in the absence of mechanical pulverization, and separating the solid from the reaction system, and (B) an organoaluminum compound;

wherein the molar ratio of the organic acid ester and halogen-containing magnesium compound is from about 0.01 to 1 to less than 1 to 1; the ratio of the mechanically pulverized product to the active-hydrogen-containing organic compound is from about 0.01 to about 10 moles of organic compound per magnesium atom in the pulverized product; and the amount of the organometallic compound of a metal of Groups II to III of the periodic table is from about 0.01 moles to about 10 moles per mole of the active hydrogen-containing compound.

7. The catalyst of claim 6 wherein the organoaluminum compound (B) is an organoaluminum compound of the formula $$R^1{}_m Al(OR^2)_n H_p X_q$$

wherein $R^1$ and $R^2$ are identical to, or different from, each other, and represent an alkyl group containing 1 to 8 carbon atoms, X represents a halogen atom, m is more than 0 but not more than 3 ($0 < m \leq 3$), n is at least 0 but less than 3 ($0 \leq n < 3$), p is at least 0 but less than 3 ($0 \leq p < 3$), q is at least 0 but less than 3 ($0 \leq q < 3$), and $m+n+p+q=3$.

* * * * *

UNITED STATES PATENT AND TRADEMARK OFFICE
CERTIFICATE OF CORRECTION

PATENT NO. : 4,294,948
DATED : October 13, 1981
INVENTOR(S) : Toyota, et al.

It is certified that error appears in the above—identified patent and that said Letters Patent is hereby corrected as shown below:

Column 17, Claim 1, line 54 should read --70 kg/cm$^2$--
Column 18, Claim 1, lines 58-59 should read --7 to 18 carbon atoms--

Column 18, Claim 1, line 69 )
Column 19, Claim 3, line 53 )
Column 20, Claim 5, line 1  )   Formula should read:
Column 20, Claim 6, line 39 )   --$R^1_m Al(OR)_n H_p X_q$--
Column 22, Claim 7, line 5  )

Signed and Sealed this

Seventeenth Day of July 1984

[SEAL]

Attest:

GERALD J. MOSSINGHOFF

Attesting Officer

Commissioner of Patents and Trademarks